Figure 1:
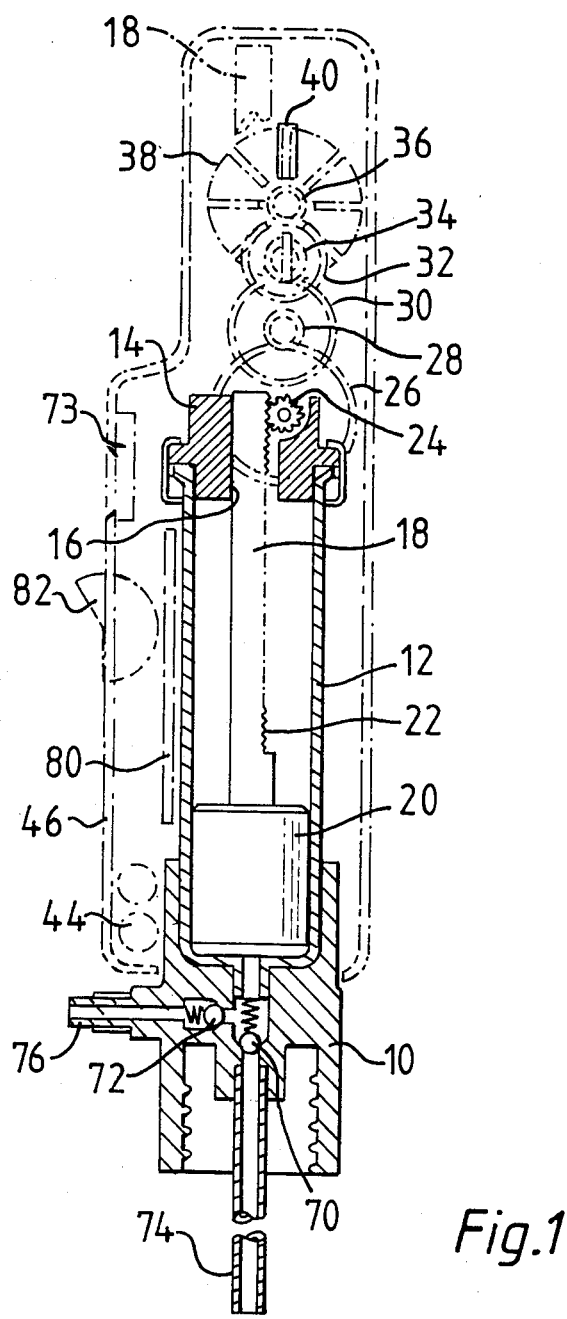

United States Patent [19]

Ball et al.

[11] Patent Number: 4,760,939
[45] Date of Patent: Aug. 2, 1988

[54] LIQUID DOSING DEVICE WITH DIGITAL DISPLAY

[75] Inventors: Graham J. Ball, Great Dunmow; William B. Hart, Ipswich; Michael H. Hurst, Bedford, all of Great Britain

[73] Assignee: Jencons (Scientific) Limited, Leighton Buzzard, England

[21] Appl. No.: 855,347

[22] Filed: Apr. 24, 1986

[30] Foreign Application Priority Data

May 4, 1985 [GB] United Kingdom ................ 8511438

[51] Int. Cl.⁴ ............................. B01L 3/02; B67D 5/08
[52] U.S. Cl. .................................. 222/23; 73/864.16; 222/383; 422/100
[58] Field of Search ..................... 222/14–16, 222/20, 21, 23, 31, 32, 36–38, 41, 43, 63, 309, 333, 401, 382, 383, 386, 390, 391, 409; 73/864.16, 864.17, 864.18; 422/100; 377/19, 89, 91, 92; 235/95 R, 96, 97, 94 R, 94 A; 604/151, 152

[56] References Cited

U.S. PATENT DOCUMENTS

| 3,319,840 | 5/1967 | Oehme et al. ...................... 222/333 |
| 4,159,784 | 7/1979 | d'Autry ................................ 222/32 |
| 4,192,450 | 3/1980 | Nezu .................................. 235/95 R |
| 4,475,666 | 10/1984 | Bilbrey et al. ...................... 222/14 |
| 4,526,294 | 7/1985 | Hirschmann et al. ....... 73/864.18 X |

FOREIGN PATENT DOCUMENTS

| 96088 | 12/1983 | European Pat. Off. ............ 422/100 |
| 3534550 | 10/1986 | Fed. Rep. of Germany ...... 222/383 |

Primary Examiner—Kevin P. Shaver
Attorney, Agent, or Firm—Lee & Smith

[57] ABSTRACT

A liquid dispenser has a cylinder in which a piston may move in an intake stroke and a discharge stroke. A pulse generator responds to any movement of the piston in the discharge direction, whereby a counting and readout device provides a dispensing measurement readout even for inadvertent discharge movements of the piston. Movement of the piston in the discharge direction rotates a wheel in the pulse generator. A ratchet system may be provided to prevent rotation of the wheel in reverse during intake movements of the piston. Alternatively the wheel rotates in both directions, and a discriminator is provided to discriminate between the two directions of movement.

9 Claims, 6 Drawing Sheets

LIQUID DOSING DEVICE WITH DIGITAL DISPLAY

FIELD OF THE INVENTION

This invention relates to liquid dispensing means.

BACKGROUND TO THE INVENTION

European Patent Specification No. 0096088 discloses a liquid dispensing device capable of drawing liquid into the device from a container during an intake stroke, and expelling liquid from the device during a delivery stroke. The volume of liquid delivered during the delivery stroke is displayed on a digital display. However, the device does not always register liquid delivered. For example, if during an intake stroke a small amount of liquid is delivered, whether deliberately or accidentally, no record of this appears on the digital display. This is a disadvantage which the present invention is intended to overcome.

SUMMARY OF THE INVENTION

According to the invention liquid dispensing means comprise a cylinder, a piston movable with respect to the cylinder in either an intake stroke in which liquid is drawn into the cylinder from a reservoir of the liquid, or a delivery stroke during which the liquid is dispensed from the cylinder, pulse generating means for producing pulses representative of the relative movement of the piston and cylinder, and counting and readout means linked to the pulse generating means and operative to count the pulses and indicate the volume of liquid dispensed from the cylinder during a delivery stroke, wherein any relative movement of the piston and cylinder in a direction corresponding to a delivery stroke causes the counting and readout means to indicate a corresponding volume of liquid dispensed, whereby during an intake stroke any inadvertent relative movement of the piston and cylinder in a direction corresponding to a delivery stroke causes the counting and readout means to register a volume of liquid dispensed corresponding to the magnitude of the inadvertent movement. Preferably the cylinder is fixed, eg mounted on a bottle forming said reservoir, and said piston is slidable in the cylinder. Manually operable actuating means may be provided to cause sliding movement of the piston within the cylinder, the manually operable actuating means being connected to the pulse generating means through a drive system which is such that the number of pulses registered in the counting and readout means is representative of the amplitude of piston movement in a dispensing sense and therefore volume of liquid dispensed.

The drive system may include ratchet means which ensure that the pulse generating means are driven whenever the piston is moved in a direction corresponding to the delivery stroke (ie in the dispensing sense), but which prevent the pulse generating means being driven when the piston is moved in a direction corresponding to an intake stroke. Hence, any movement of the piston in the dispensing sense will produce a corresponding number of pulses which will register in the counting and readout means.

The ratchet means preferably comprise two ratchet wheels which operate in opposite rotational directions and which have mounted between them an actuating member of the pulse generating means. Rotation of the actuating member causes pulses to be generated, for example by :

(i) arranging for the actuating member to carry magnetic poles which move past a reed switch which produces electrical pulses, (ii) arranging for the actuating member to be a ferrous wheel having blades which rotate between a permanent magnet and a reed switch so that the latter produces said pulses, or (iii) arranging for the actuating member to drive a piezo-electric transducer which generates said pulses.

The invention applies particularly to liquid dispensing means in the form of a device for placing on a bottle in order to dispense a liquid contained in the bottle. The device could also be such that the connection with the bottle is a remote link or whereby the device is hand-held and only connected with the bottle intermittently to be charged with liquid.

Alternatively, the drive system may be such that pulses are generated in both the delivery stroke and the intake stroke, with discriminating means being provided to discriminate between a delivery stroke movement and an intake stroke movement and to cause pulses generated in a delivery stroke movement, but not in an intake stroke movement, to actuate the counting and readout means. The discriminating means may include two stationary electrical contacts and a third electrical contact movable into contact with one or other of the stationary contacts in dependence upon the direction of relative movement of the piston and cylinder. The discriminating means may alternatively include a magnet and reed switch which cooperate together to provide an electrical signal dependent on the direction of relative movement of the piston and cylinder.

Figure 2:
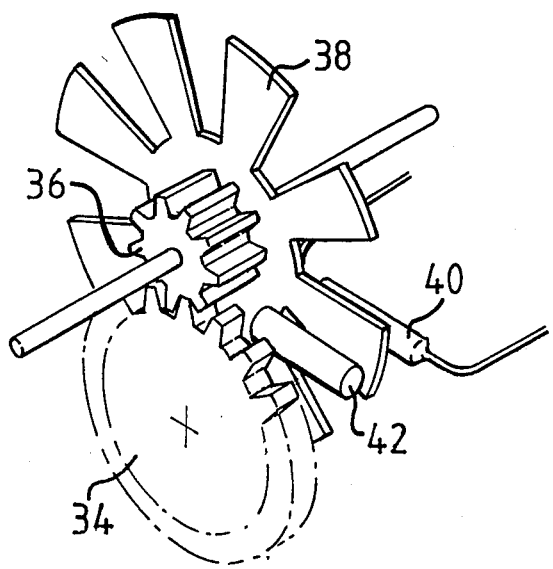
Figure 4:
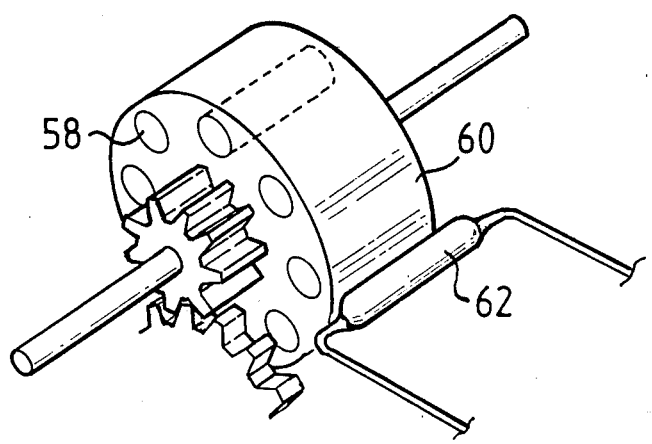
Figure 5:
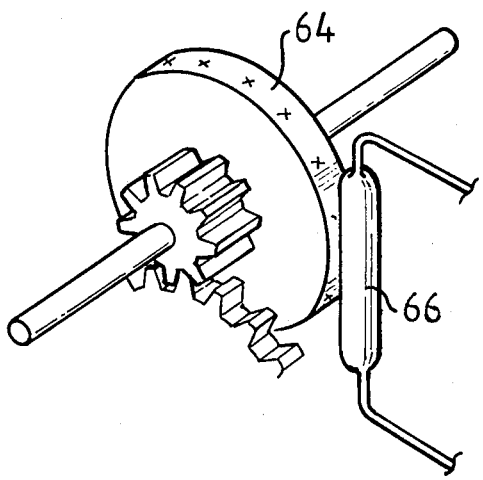
Figure 6:
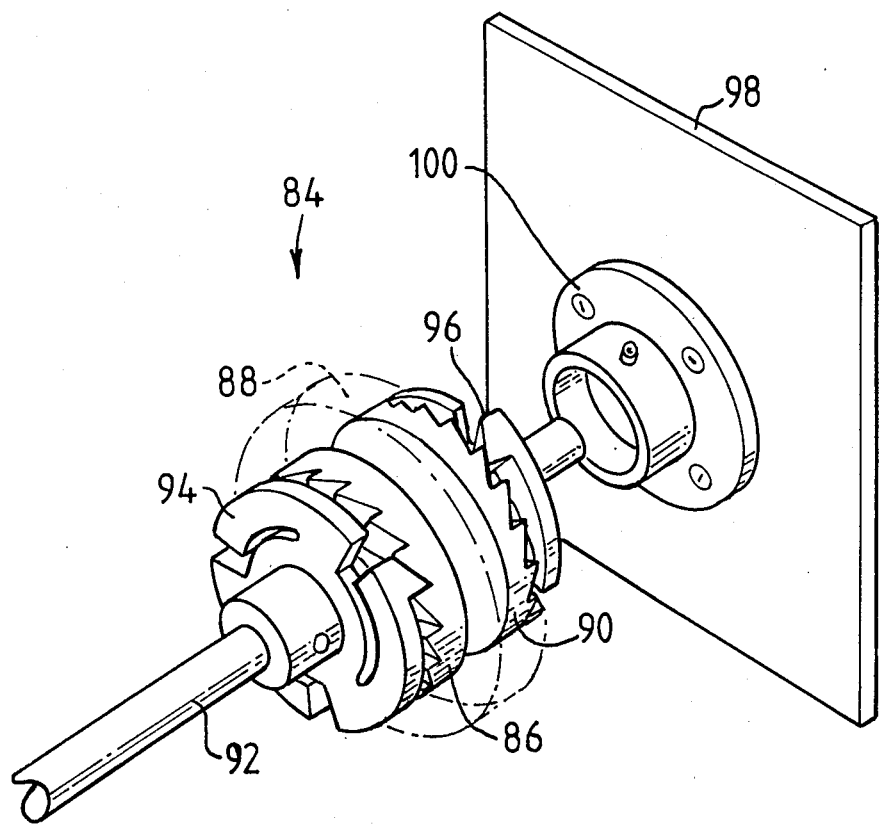
Figure 7:
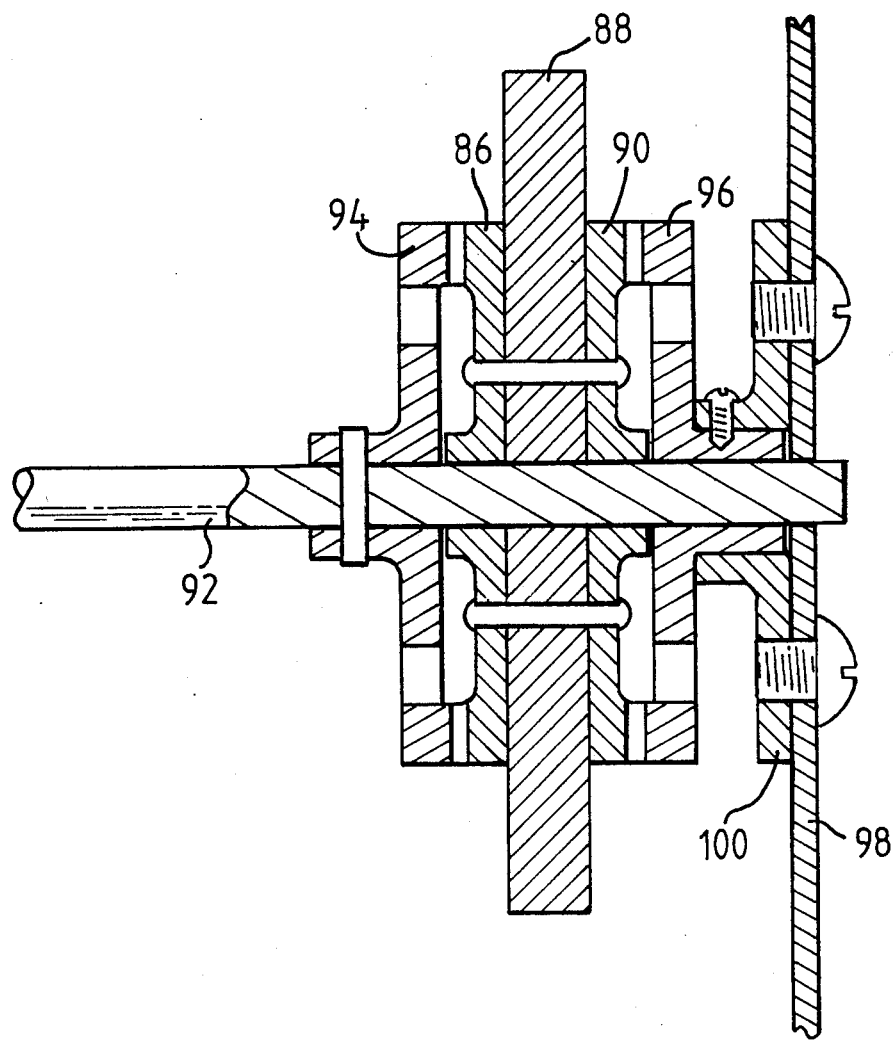
Figure 8:
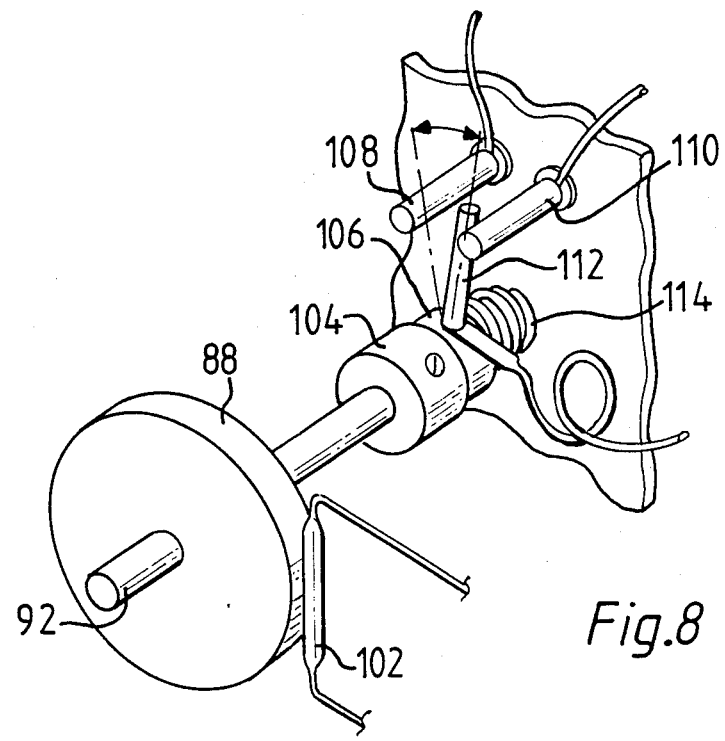
Figure 9:
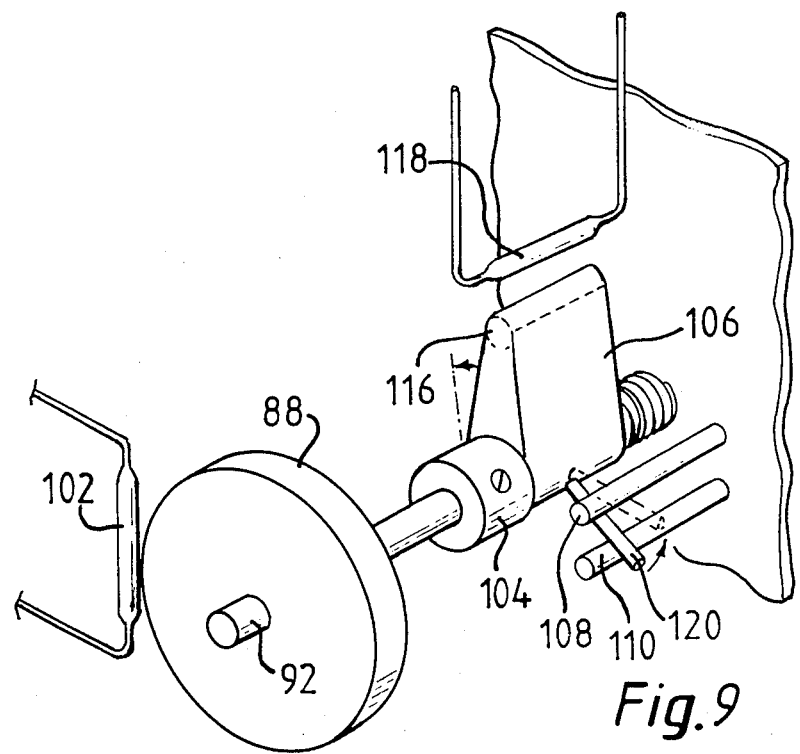

An embodiment of the invention, and various modified constructions, will now be described, by way of example, with reference to the drawings, in which :

FIG. 1 is a sectional view of a device forming the preferred embodiment of liquid dispensing means, FIG. 2 shows a perspective view of pulse generating means of the embodiment of FIG. 1, FIGS. 3 to 5 are views respectively illustrating three modified constructions of pulse generating means, FIG. 6 is a perspective view of ratchet means of the device, FIG. 7 is a sectional view of the ratchet means of FIG. 6, FIGS. 8 and 9 show two alternatives to the ratchet means of FIGS. 6 and 7.

Referring to FIG. 1, the device comprises a valve block 10 into which is fixed an upwardly projecting cylinder 12 capped by an end block 14. The block 14 has a through slot 16 which guides sliding movement of a piston rod 18 carrying at its lower end a piston 20 slidable within the cylinder 12. When coupled to a bottle (not shown) the valve block 10 is a rigid mounting point that remains fixed with respect to the bottle throughout the functional cycle of the device. The cylinder 12 is rigidly attached to the valve block 10 and hence the cylinder 12 also remains fixed relative to the valve block 10 and bottle throughout the functional cycle of the device.

The piston 20 is free to slide in the cylinder 12 between limits determined at one extreme by the base of the cylinder 12 and at the other extreme by the block 14. In an alternative embodiment, the stop and the bearing for the piston rod 18 may be partially separated.

The piston rod 18 has a rack gear 22 formed or fixed to one face, and the rack gear 22 engages with a pinion gear 24 rotatably mounted in the block 14. The pinion gear 24 is caused to rotate by means of manually operated hand wheels (not shown) mounted on either the shaft through gears 28 and 30 or optionally, on the shaft through gears 24 and 26. The coupling between the shaft and handwheels may be either rigid or by means of a torque limiting coupling.

Also coupled to the pinion gear 24 is a gear train consisting of six meshing spur gears 26, 28, 30, 32, 34, and 36 which drive a ferrous serrated wheel 38 having blades alternating with gaps (FIG. 2). The gear ratios are such that a small movement of the piston 20, caused by a small rotation of the hand wheel, results in a large rotation of the ferrous serrated wheel 38.

A small reed switch 40 and a permanent magnet 42 (FIG. 2) are positioned parallel to each other with the serrated wheel 38 interposed between them. When a blade of the wheel 38 passes between the magnet 42 and the reed switch 40 the magnetic field of the reed switch 40 is shielded by the blade and falls to a value which allows the contacts to open. When a gap in the serrated wheel 38 is interposed between the magnet 42 and the reed switch 40 the magnetic field at the reed switch 40 rises to a value which causes the contacts to close.

The contacts of the reed switch 40 are connected through electronic circuitry to a counting and display system. This system is energised by a battery 44 contained within an outer casing 46.

The valve block 10 contains two non-return valves 70 and 72. A tube 74 is also mounted in the valve block 10 and projects into the bottle to be immersed in the liquid during normal operation.

When the hand wheel is rotated to raise the piston 20, liquid is drawn up the tube 74 past the non-return valve 70 and into the cylinder 12. When the hand wheel is rotated to lower the piston 20, the liquid contained in the cylinder 12 is driven out of the cylinder past the non-return valve 72 and out of a discharge tube 76. Various types of end termination may be screwed to the discharge tube orifice to suit the discharge characteristics required.

Figure 3:
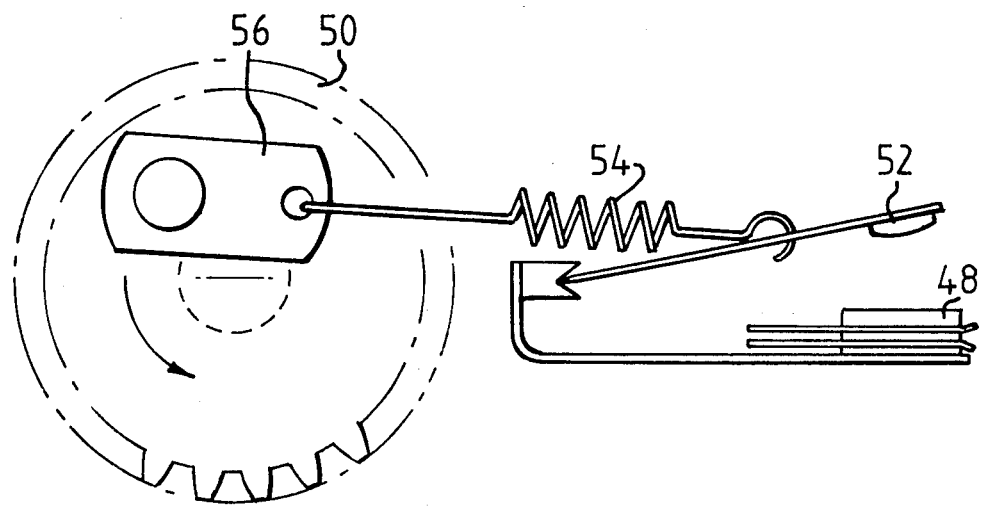

Alternative methods of providing pulses to indicate the movement of the piston 20 are illustrated in FIGS. 3, 4 and 5. FIG. 3 shows a piezo-electric transducer 48 which is repeatedly compressed and released in response to the turning of a wheel 50 rotated by the hand wheel. The transducer 48 is repeatedly compressed by the movement of a hammer 52 linked by a tension spring 54 to an eccentric crank 56 on the wheel 50. The changes in dimensions of the piezo-electric transducer 48 cause electrical charges to be developed which, when passed through electrical circuitry, are fed to a counter and display system. The charge developed when the transducer 48 is compressed is of opposite polarity to that developed when the transducer is released. The electrical circuitry can be arranged to use one or both polarities. If both polarities are used, the counter will be incremented on the compression and on the release of the transducer. If only one polarity is used, the counter will be incremented on either the compression or the release of the transducer, but not both.

FIG. 4 shows another alternative method of providing pulses to indicate movement of the piston 20. Bar magnets 58 are arranged around the circumference of a non-ferrous (eg plastics) disc 60 whch is driven by the train of gears 26 to 36. A reed switch 62 is positioned close to the periphery of the disc 60 in the same plane as the magnets 58. When the disc 60 rotates and each magnet approaches the reed switch 62, the contacts of the switch close. When the magnet 58 moves away from the reed switch 62, the contacts of the switch open.

FIG. 5 shows a further alternative method of providing pulses. A multipole magnetic wheel 64 (having alternating North and South poles around its periphery) is rotatably driven by the train of gears 26 to 36, and a reed switch 66 is repeatedly operated and released, as before. The counting and display system consists of a digital display unit 73 (FIG. 1) connected to electronic circuitry mounted on a panel 80. A switch 82 is provided to enable the display to be zeroed at the start of the dispensing cycle.

The liquid dispensing means ensure that the volume of any liquid dispensed through the tube 76 is recorded on the digital display—whether this liquid is dispensed deliberately, or accidentally during what should otherwise be an intake stroke. This is achieved by ratchet means which prevent rotation of the pulse generating means in the direction corresponding to the piston 20 rising in the cylinder 12, (ie a liquid intake movement), but allow rotation whenever the piston 20 is caused to move in the dispense direction—whether this be deliberate or accidental.

FIGS. 6 and 7 show the ratchet means 84. A ratchet wheel 86 is fixed rigidly to a wheel 88 which is constituted by the wheel 38, 50, 60 or 64 of the various types of pulse generating means previously described. A second ratchet wheel 90 of opposite hand to the first is also fixed co-axially with wheels 86 and 88, such that the assembly of wheels 86, 88 and 90 is free to rotate as a unit on a shaft 92. The shaft 92 is driven by the hand wheel through the gear train 26 to 36 of FIG. 1. A pawl wheel 94 is mounted on the shaft 92 and engages the ratchet wheel 86. A second pawl wheel 96 of opposite hand to the wheel 94 is arranged to engage with ratchet wheel 90. This second pawl wheel 96 is fixed to a backplate 98 by means of some mechanical fixture, such as the flanged coupling 100. The shaft 92 is free to rotate relative to items 86, 88, 90, 96, 98 and 100 unless prevented from doing so by engagement of the various ratchet/pawl teeth.

In a delivery stroke, the pawl wheel 94 engages with the ratchet wheel 86, and causes the wheel 88 to rotate in the same sense as the shaft 92 (clockwise in FIG. 6). In doing so, the pawls on the wheel 96 slip over the teeth of ratchet wheel 90. In an intake stroke, the pawls on the wheel 96 engage with the teeth on the ratchet wheel 90, and prevent the wheel 88 from rotating. In practice, a very small rotation of the magnetic wheel would be experienced to take up the minimum clearance between any of the teeth on items 96 and 90. The device therefore achieves the objective of only delivering pulses to the counter and digital display when the piston moves in a direction corresponding to a delivery stroke. Movement in the direction corresponding to an intake stroke results in no pulse generation.

Alternative methods of achieving the drive provided by the pawls and the ratchet wheels would be to use ball/detent ratchet clutches. These devices rely on the drive being transmitted through a ball bearing which is driven into engagement by a tapered slot in the driven member. In use, the shaft 92 is caused to rotate by means of a gear transmission linked to the piston rod. The direction of rotation depends on the direction of piston movement, and it is not critical whichever of the two possible options is chosen, providing the device is handled accordingly. In the case illustrated in FIGS. 6 and 7, the ratchet teeth are handled in the sense corresponding to downward movement of the piston 20 (ie delivery stroke) corresponding to clockwise movement of the shaft 92. Typically the gear ratio causing the rotation of the shaft 92 would be such that 61 turns of the shift 92 correspond to 0.01 ml of liquid being dispensed. Other ratios are, of course, possible depending on the proportion of the cylinder and piston.

The pawl wheel 94 is fixed to the shaft 92 and carries a number of cantilevered pawls. The pitch of the pawls is arranged to be a non-integral multiple of the pitch of the teeth on the ratchet wheel 86, such that the following conditions are satisfied:

1. Pitch of pawl teeth × no of pawl teeth = pitch of ratchet teeth × no of ratchet teeth 2. $\frac{\text{No of ratchet teeth}}{\text{No of pawl teeth}} = \text{Integer} + \text{non zero fractional part}$ Satisfying these conditions ensures that when any one of the pawl teeth are engaged in a ratchet tooth, then the remaining pawl teeth are not engaged by the non-zero fractional part. Thus, if we had say 20 teeth on the ratchet wheel, and three pawl teeth then the fractional part would be $\frac{2}{3}$. One of the pawl teeth would therefore be $\frac{1}{3}$ of a pitch away from engagement when any other pawl tooth was engaged.

The technique ensures that the effective pitch of the ratchet is reduced to the Nth part of the actual ratchet wheel tooth pitch, where N is the number of pawl teeth. Tests on the ratchet means of FIGS. 6 and 7 have revealed a problem: the inertia of the magnetic wheel 88 causes overrun which, in turn, results in an error in the indicated volume.

Further tests have shown that the amount of overrun can be reduced to zero for all normal modes of use by fitting a slipping brake mechanism to the magnetic wheel. Unfortunately however, this technique is not sufficiently reliable to be used in a commercial product. It also has the disadvantage that the brake resistance is active at all times, and this results in unacceptable stiffness at the hand wheel.

The alternative systems described below with reference to FIGS. 8 and 9, overcome these problems. In FIG. 8, the pulse generating magnetic wheel 88 is rigidly fixed to the output shaft 92 of the geartrain described previously. The wheel 88 therefore rotates clockwise or anti-clockwise depending on which way the hand wheel is being turned. A reed switch 102 is positioned beside the periphery of the wheel 88. A slipping clutch is provided consisting of a driving member 104 which is rigidly fixed on the shaft 92, engaging with a driven member 106 which is free to rotate on the shaft 92. The actual angle of rotation of the driven member is limited by two spaced, stationary stops 108, 110. A spring 114 is provided to preload the driven member 106 into engagement with the driving member 104. The drive member 106 carries a movable contact 112.

During normal use, the clutch driven member 106 will be urged to cause the contact 112 to bear against one of the two stops 108 or 110, depending on the direction of rotation of the shaft 92. Reversal of the direction of rotation of the shaft 92 rapidly leads to the driven member 106 rotating through a small angle before the other stop is engaged, to prevent any further rotation. Electronic discriminating means detect which of the two stops 108, 110 is engaged, and activate the electronic system to allow the display to accumulate counts from reed switch 102 or to inhibit further counting as appropriate. The contact 112 forms a 'common' electrical terminal which engages one or other of the two stops 108, 110 depending on the direction of rotation of the shaft 92. An electrical circuit is therefore created through the common terminal and one limit stop. The electronic system coupled to this circuit either enables or inhibits the counting.

Clearly, one characteristic of this system that potentially detracts from the accuracy of the displayed reading is the fact that a small 'dead band' exists between the limit stops during which no circuit exists. During this period rotation of the pulse generating magnetic wheel 88 can occur without either of the limit stops being engaged. This problem is overcome by providing an 'electronic latch' in the count enabling electronics such that any given state is retained until the alternative limit stop is actually engaged. A further improvement to the accuracy of the display can be obtained by making the permissible angle of rotation of the driven member 106 smaller than the angle between poles of the magnetic wheel 88. This maintains the accuracy to within the limits of resolution of the display. An alternative discriminating means for determining the direction of rotation of the shaft 92 is illustrated in FIG. 9. This consists of a permanent magnet 116 attached to the clutch driven member 106 such that the magnet axis is parallel to the shaft 92, but is offset by a certain distance. The magnet 116 is therefore caused to rotate through a small arc until engagement of a rod 120 with one or other stop 108, 110 prevents any further movement. A reed switch 118 is mounted in a fixed position that is radially offset to allow a small working clearance between the magnet 116 and the reed switch 118. In one of the two stable positions, the magnet 116 lies close to the reed switch 118, and in the other stable position, the magnet 116 is offset from the reed switch.

In the first position, the magnet 116 is close enough to the reed switch 118 to cause the reed switch to operate. In the second position, the magnet 116 is further away from the reed switch 118, which therefore releases. The two possible states of the reed switch are used in the electronic discriminating means to enable or disable the counting means which count the pulses, as appropriate to the direction of rotation of the shaft 92.

I claim:
1. Liquid dispensing device comprising:
   a cylinder;
   a piston movable within the cylinder in either an intake stroke for drawing liquid into the cylinder from a reservoir of liquid, or a delivery stroke for dispensing such liquid from the cylinder;
   pulse generating means linked to said piston and cylinder for producing pulses representative of the relative movement of the piston in the cylinder;
   counting and readout means linked to the pulse generating means and operative to count the pulses and indicate the volume of liquid dispensed from the cylinder during a delivery stroke;
   a drive system connected to said piston and said pulse generating means, and
   actuating means which is manually operable to operate the drive system to cause sliding movement of the piston within the cylinder, the manually operable actuating means being connected to the pulse generating means through the said drive system, whereby the number of pulses registered in the counting and readout means being representative of the amplitude of piston movement in a dispensing sense and therefore volume of liquid dispensed, said drive system including ratchet means which ensures that the pulse generating means is driven whenever the piston is moved in a direction corresponding to a delivery stroke, but which prevents the pulse generating means from being driven when the piston is moved in a direction corresponding to an intake stroke, said pulse generating means comprising an actuating member, rotation of which causes pulse to be generated, and in which the ratchet means comprises two ratchet wheels which operate in opposite rotational directions and which have the said actuating member mounted between them whereby, any relative movement of the piston in the cylinder in a direction corresponding to a delivery stroke causes the counting and readout means to indicate a corresponding volume of liquid dispensed and that during an intake stroke any inadvertent relative movement of the piston in the cylinder in a direction corresponding to a delivery stroke causes the counting and readout means to register a volume of liquid dispensed corresponding to the magnitude of the inadvertent movement.

2. Liquid dispensing device according to claim 1, in which the pulse generating means further comprises a reed switch and the actuating member carries magnetic poles which move past the reed switch so as to produce electrical pulses when the actuating member rotates.

3. Liquid dispensing device according to claim 1, in which the pulse generating means further comprises a reed switch and a permanent magnet, and the actuating member is a ferrous wheel having blades which rotate between the permanent magnet and the reed switch so that the latter produces said pulses when the actuating member rotates.

4. Liquid dispensing device according to claim 1, in which the pulse generating means further comprises a piezoelectric transducer which is actuated by the actuating member and generates said pulses when the actuating member rotates.

5. Liquid dispensing device according to claim 1, in which the cylinder is mounted on said reservoir and said reservoir comprises a bottle.

6. Liquid dispensing device according to claim 1, in which said reservoir comprises a remote bottle and said cylinder connectable to the remote bottle to dispense a liquid contained in the bottle.

7. Liquid dispensing device according to claim 1, in which said reservoir comprises a bottle and said cylinder is adapted to be handheld and only connected with the bottle intermittently to be charged with liquid.

8. Liquid dispensing device according to claim 1, in which the cylinder is fixed and the piston is slidable in the cylinder.

9. Liquid dispensing device according to claim 8, in which the cylinder is mounted on said reservoir and said reservoir comprises a bottle.

* * * * *